US011425977B2

(12) United States Patent
Kan et al.

(10) Patent No.: US 11,425,977 B2
(45) Date of Patent: Aug. 30, 2022

(54) EYEWEAR CASE

(71) Applicant: Mitsui Chemicals, Inc., Tokyo (JP)

(72) Inventors: Ryuki Kan, Saijyo (JP); Masayoshi Hino, Saijyo (JP); Akihiro Muramatsu, Marugame (JP)

(73) Assignee: Mutsui Chemicals, Inc., Tokyo (JP)

( * ) Notice: Subject to any disclaimer, the term of this patent is extended or adjusted under 35 U.S.C. 154(b) by 217 days.

(21) Appl. No.: 16/336,857

(22) PCT Filed: Sep. 15, 2017

(86) PCT No.: PCT/JP2017/033593
§ 371 (c)(1),
(2) Date: Mar. 26, 2019

(87) PCT Pub. No.: WO2018/066346
PCT Pub. Date: Apr. 12, 2018

(65) Prior Publication Data
US 2020/0383441 A1 Dec. 10, 2020

(30) Foreign Application Priority Data

Oct. 3, 2016 (JP) .............................. JP2016-195574

(51) Int. Cl.
*A45C 11/04* (2006.01)
*A45C 13/02* (2006.01)
(Continued)

(52) U.S. Cl.
CPC .............. *A45C 11/04* (2013.01); *A45C 13/02* (2013.01); *G02C 7/083* (2013.01); *H02J 7/0045* (2013.01); *A45F 2200/0541* (2013.01)

(58) Field of Classification Search
CPC ........ A45C 13/02; G02C 7/083; G02C 11/02; H02J 7/0045; A45F 2200/0541
(Continued)

(56) References Cited

U.S. PATENT DOCUMENTS 5,016,749 A * 5/1991 Kaye .................... A45C 11/046
206/5
6,026,950 A * 2/2000 Wisniewski ........... A45C 11/04
206/6
(Continued)

FOREIGN PATENT DOCUMENTS

JP     H04-051225     4/1992
JP     3040657 U      6/1997
(Continued)

OTHER PUBLICATIONS

Japanese Office Action dated Mar. 3, 2020 in Japanese Patent Application No. 2018-543820, 7 pages.
(Continued)

*Primary Examiner* — Rafael A Ortiz
*Assistant Examiner* — Sanjidul Islam
(74) *Attorney, Agent, or Firm* — Sterne, Kessler, Goldstein & Fox P.L.L.C.

(57) ABSTRACT

An eyeglasses case has a case main body having an eyeglasses accommodating portion in which electronic eyeglasses are accommodated, and a charger accommodating portion that is provided so as to be sectioned off from the eyeglasses accommodating portion and in which a charger of the electronic eyeglasses is accommodated. Further, the eyeglasses case has a cover portion that, by being engaged with the case main body, forms a space in which the electronic eyeglasses and the charger are accommodated between the cover portion and the case main body, and the cover portion has a displacement restricting portion that restricts movement of the charger within the charger accommodating portion.

10 Claims, 7 Drawing Sheets

(51) Int. Cl.
*H02J 7/00* (2006.01)
*G02C 7/08* (2006.01)

(58) Field of Classification Search
USPC .................................................. 206/5, 6, 223
See application file for complete search history.

(56) References Cited

U.S. PATENT DOCUMENTS

| | | | | |
|---|---|---|---|---|
| D612,148 S | * | 3/2010 | Treece | .......................... D3/203.1 |
| 8,985,320 B2 | * | 3/2015 | Santarelli | ............... A45C 11/04 |
| | | | | 206/5 |
| 2002/0096439 A1 | * | 7/2002 | Lin | ......................... A45C 11/34 |
| | | | | 206/6 |
| 2009/0251660 A1 | | 10/2009 | Figler et al. | |
| 2012/0292205 A1 | | 11/2012 | Waters | |

FOREIGN PATENT DOCUMENTS

| | | | |
|---|---|---|---|
| JP | 3079448 U | | 8/2001 |
| JP | 2003-180433 A | | 7/2003 |
| JP | 2006263335 A | * | 10/2006 |
| JP | 2006263335 A | | 10/2006 |
| JP | 2007117187 A | | 5/2007 |
| JP | 2011085929 A | | 4/2011 |
| JP | 2011-516927 A | | 5/2011 |
| JP | 2012049793 A | | 3/2012 |
| JP | 2013-125202 | | 6/2013 |
| WO | 2010113208 A1 | | 10/2010 |

OTHER PUBLICATIONS

Japanese Office Action dated Nov. 4, 2020 in Japanese Application No. 2018-543820.
Japanese Office Action dated Jul. 14, 2020 in Japanese Application No. 2018-543820.

* cited by examiner

EYEWEAR CASE

TECHNICAL FIELD

The present invention relates to an eyewear case.

BACKGROUND ART

Eyewear (electronic eyeglasses), at which the focal length of regions that are portions of the lenses can be changed with respect to the focal length of the other regions, is disclosed in Japanese Patent Application Laid-Open (JP-A) No. 2011-516927. Further, this eyewear has a battery for supplying electricity to a driving circuit that changes the focal length of the regions that are portions of the lenses.

Further, Japanese Utility Model Registration No. 3040657 and JP-A No. 2003-180433 disclose eyewear cases for accommodating eyewear.

SUMMARY OF INVENTION

Technical Problem

By the way, for eyewear having an accessory such as a battery or the like such as the eyewear disclosed in JP-A No. 2011-516927, it is desirable to be able to accommodate the eyewear and the accessory of the eyewear in an eyewear case and to be able to restrict movement of the accommodated accessory.

In view of the above-described circumstances, an object of the present invention is to provide an eyewear case that can accommodate eyewear and an accessory, and that can restrict movement of the accommodated accessory.

Solution to Problem

An eyewear case of a first aspect comprises: a case main body having an eyewear accommodating portion in which eyewear is accommodated, and an accessory accommodating portion that is provided so as to be sectioned off from the eyewear accommodating portion and in which an accessory of the eyewear is accommodated; and a cover portion that, by closing the case main body, forms a space in which the eyewear and the accessory are accommodated between the cover portion and the case main body, the cover portion having a restricting portion that restricts movement of the accessory within the accessory accommodating portion.

In accordance with the eyewear case of the first aspect, eyewear is accommodated in the eyewear accommodating portion of the case main body, and an accessory of the eyewear is accommodated in the accessory accommodating portion of the case main body. Further, due to the cover portion closing the case main body, the eyewear and the accessory are accommodated within the eyewear case. Due thereto, the eyewear and the accessory can be carried around in the state in which the eyewear and the accessory are accommodated within the eyewear case. Here, in the invention of the first aspect, movement of the accessory within the accessory accommodating portion can be restricted by the restricting portion that is provided at the cover portion. In this way, in the invention of the first aspect, the eyewear and the accessory can be accommodated, and movement of the accommodated accessory can be restricted.

In an eyewear case of a second aspect, in the eyewear case of the first aspect, in a state in which the cover portion closes the case main body, the restricting portion abuts the accessory accommodating portion or the accessory that is accommodated in the accessory accommodating portion.

In accordance with the eyewear case of the second aspect, due to the restricting portion abutting the accessory accommodating portion in a state in which the cover portion closes the case main body, movement of the accessory within the accessory accommodating portion can be restricted. Or, due to the restricting portion abutting the accessory in the state in which the cover portion closes the case main body, movement of the accessory within the accessory accommodating portion can be restricted.

In an eyewear case of a third aspect, in the eyewear case of the first aspect, the accessory accommodating portion has an opening portion through which the accessory is inserted and removed, and, in a state in which the cover portion closes the case main body, the restricting portion is positioned so as to block off at least a portion of the opening portion of the accessory accommodating portion.

In accordance with the eyewear case of the third aspect, in the state in which the cover portion closes the case main body, the restricting portion is positioned so as to block off at least a portion of the opening portion of the accessory accommodating portion, and, due thereto, removal of the accessory from the accessory accommodating portion can be suppressed.

In an eyewear case of a fourth aspect, in the eyewear case of the first aspect, the case main body is substantially rectangular, and the accessory accommodating portion is provided at a central portion in a length direction of the case main body, and the eyewear accommodating portion is formed in a U-shape as seen from a direction of opening the eyewear accommodating portion.

In accordance with the eyewear case of the fourth aspect, the accessory accommodating portion is provided at the above-described position, and the eyewear accommodating portion is formed in the above-described shape. Due thereto, in the state in which the eyewear is accommodated within the eyewear accommodating portion, portions of the eyewear can be disposed at the both sides (the both sides in the length direction of the case main body) of the accessory accommodating portion at the eyewear accommodating portion. As a result, movement of the eyewear within the eyewear accommodating portion can be restricted.

In an eyewear case of a fifth aspect, in the eyewear case of the first aspect, the eyewear has temples that are worn at a head portion of a user, and the case main body is substantially rectangular, and the accessory accommodating portion is provided at a central portion in a length direction of the case main body, and, in a state in which the eyewear is accommodated in the eyewear accommodating portion, the temples are disposed at both sides of the accessory accommodating portion in the length direction of the case main body.

In accordance with the eyewear case of the fifth aspect, in the state in which the eyewear is accommodated in the eyewear accommodating portion, the temples of the eyewear can be disposed at the both sides (the both sides in the length direction of the case main body) of the accessory accommodating portion at the eyewear accommodating portion. As a result, movement of the eyewear within the eyewear accommodating portion can be restricted.

In an eyewear case of a sixth aspect, in the eyewear case of any aspect of the first aspect through the fifth aspect, the accessory accommodating portion is provided so as to be connected to both a bottom surface and a side surface of the case main body.

In accordance with the eyewear case of the sixth aspect, due to the accessory accommodating portion being provided so as to be connected to both the bottom surface and a side surface of the case main body, the rigidity of the portion, at which the accessory accommodating portion is provided, of the case main body can be improved.

In an eyewear case of a seventh aspect, in the eyewear case of any aspect of the first aspect through the sixth aspect, the restricting portion is provided so as to be connected to both an upper surface and a side surface of the cover portion.

In accordance with the eyewear case of the seventh aspect, due to the restricting portion being provided so as to be connected to both the upper surface and a side surface of the cover portion, the rigidity of the portion, at which the restricting portion is provided, of the cover portion can be improved.

In an eyewear case of an eighth aspect, in the eyewear case of any aspect of the first aspect through the seventh aspect, the cover portion is rotatably mounted to the case main body via a hinge portion, and the accessory accommodating portion is provided at a side, which is opposite from the hinge portion, at the case main body, and the restricting portion is provided at a side, which is opposite from the hinge portion, at the cover portion.

In accordance with the eyewear case of the eighth aspect, due to the accessory accommodating portion and the restricting portion being provided at the above-described positions, at the time when the cover portion is rotated with respect to the case main body, the accessory accommodating portion and the restricting portion can be moved apart. Due thereto, the accessory can easily be accommodated in the accessory accommodating portion.

In an eyewear case of a ninth aspect, in the eyewear case of the first aspect, the eyewear accommodating portion is an eyeglasses accommodating portion in which eyeglasses, which have a frame and a pair of lenses that are held at the frame, are accommodated, and, in a state in which the cover portion closes the case main body, the restricting portion is positioned between the pair of lenses.

In accordance with the eyewear case of the ninth aspect, eyeglasses are accommodated in the eyeglasses accommodating portion of the case main body. Further, due to the cover portion closing the case main body, the restricting portion that is provided at the cover portion is positioned between the pair of lenses of the eyeglasses. Due thereto, displacement of the eyeglasses within the eyeglasses accommodating portion of the case main body is restricted by the restricting portion that is provided at the cover portion. In this way, in the invention of the ninth aspect, movement of the eyeglasses and the accessory can be restricted by the restricting portion that is provided at the cover portion.

In an eyewear case of a tenth aspect, in the eyewear case of any aspect of the first aspect through the ninth aspect, an accessory for charging, which is for charging a battery provided at the eyewear, is accommodated in the accessory accommodating portion.

In accordance with the eyewear case of the tenth aspect, an accessory for charging is accommodated in the accessory accommodating portion of the case main body. Further, movement of the accessory for charging within the accessory accommodating portion can be restricted by the restricting portion. Due thereto, in the invention of the tenth aspect, the eyewear and the accessory for charging can be carried around in a state in which interference between the accessory for charging and the eyewear is suppressed.

In an eyewear case of an eleventh aspect, in the eyewear case of the tenth aspect, the accessory for charging is a cable for charging that is connected to the eyewear, or a charger that charges the battery.

In accordance with the eyewear case of the eleventh aspect, the eyewear and the cable for charging or the charger can be carried around in a state in which interference between the eyewear and the cable for charging or the charger is suppressed.

Advantageous Effects of Invention

The eyewear case relating to the present invention has the excellent effect that eyewear and an accessory can be accommodated, and movement of the accommodated accessory can be restricted.

DESCRIPTION OF EMBODIMENTS

Figure 1:
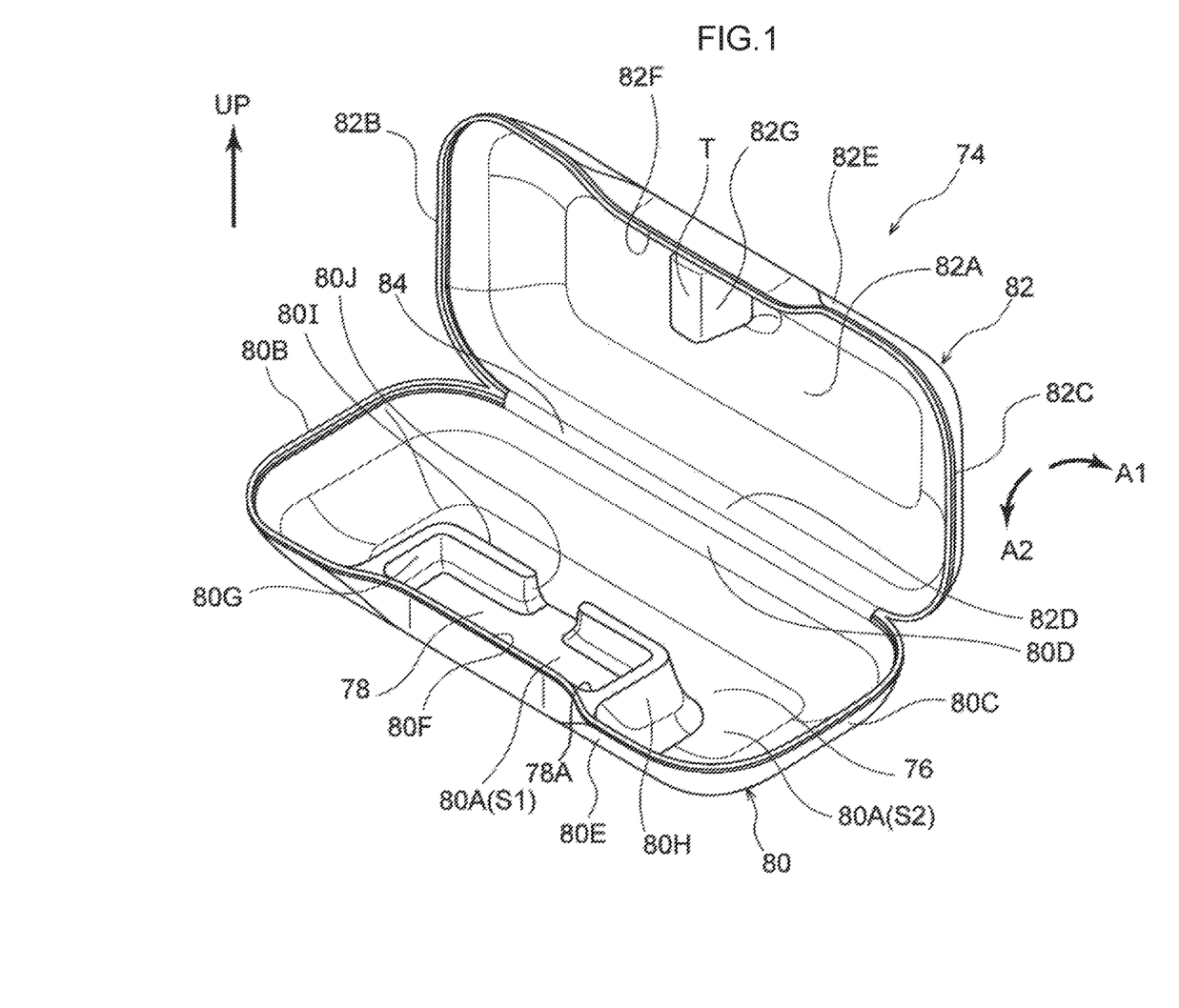
FIG. 1 is a perspective view showing an eyeglasses case of a present embodiment.
Figure 2:
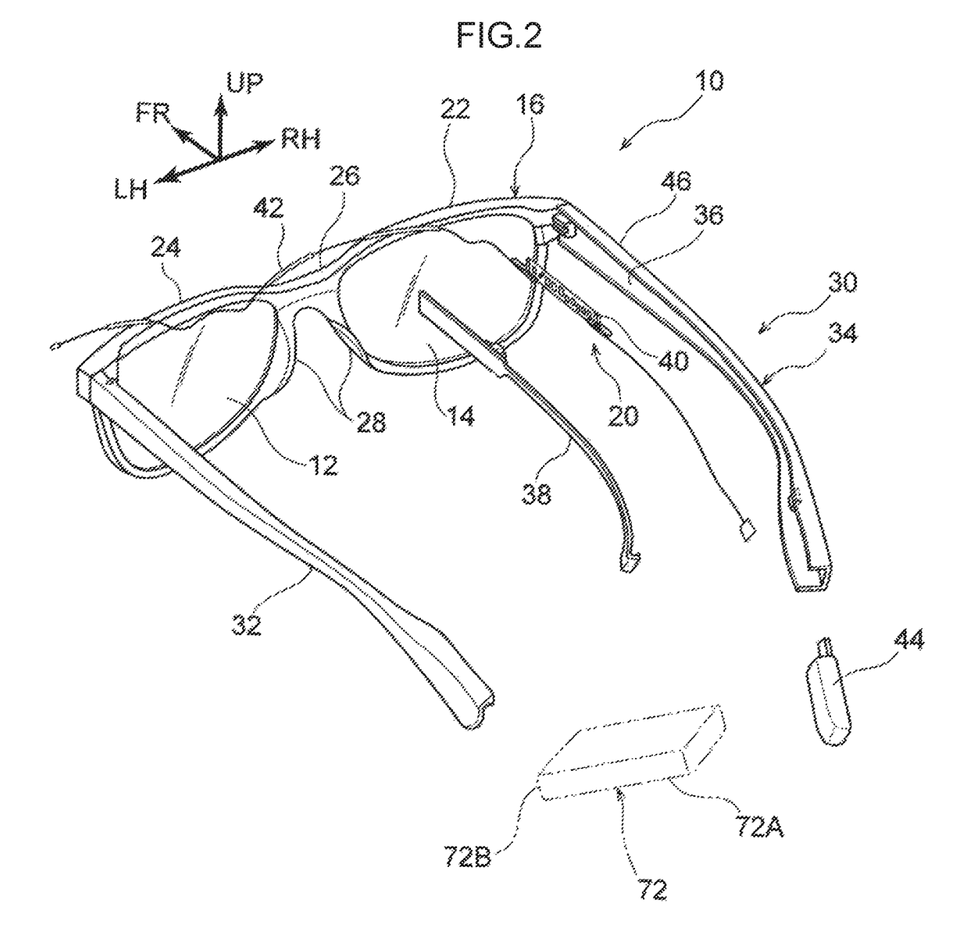
FIG. 2 is an exploded perspective view showing electronic eyeglasses in a disassembled state.
Figure 3:
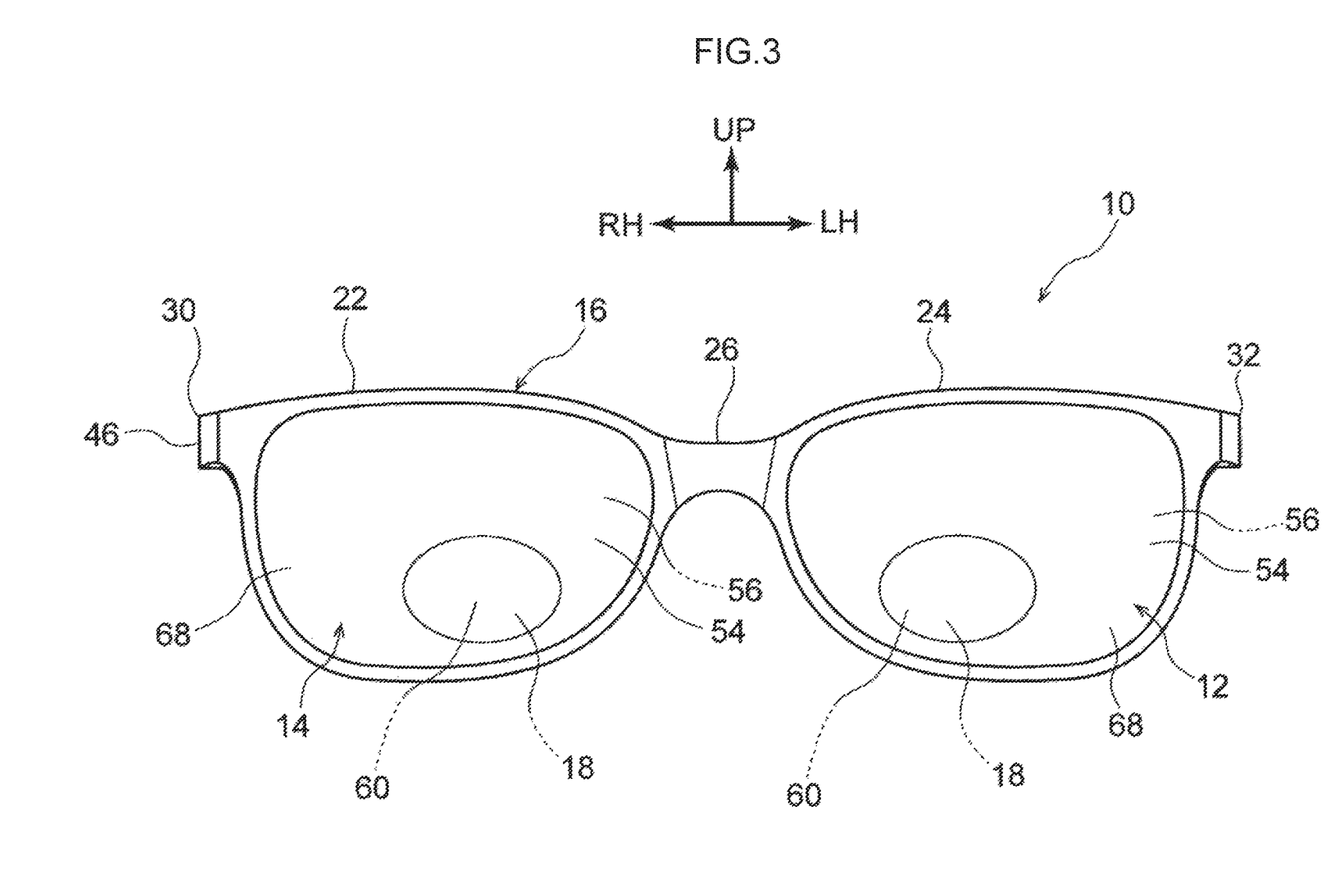
FIG. 3 is a front view showing the electronic eyeglasses of the present embodiment.
Figure 4:
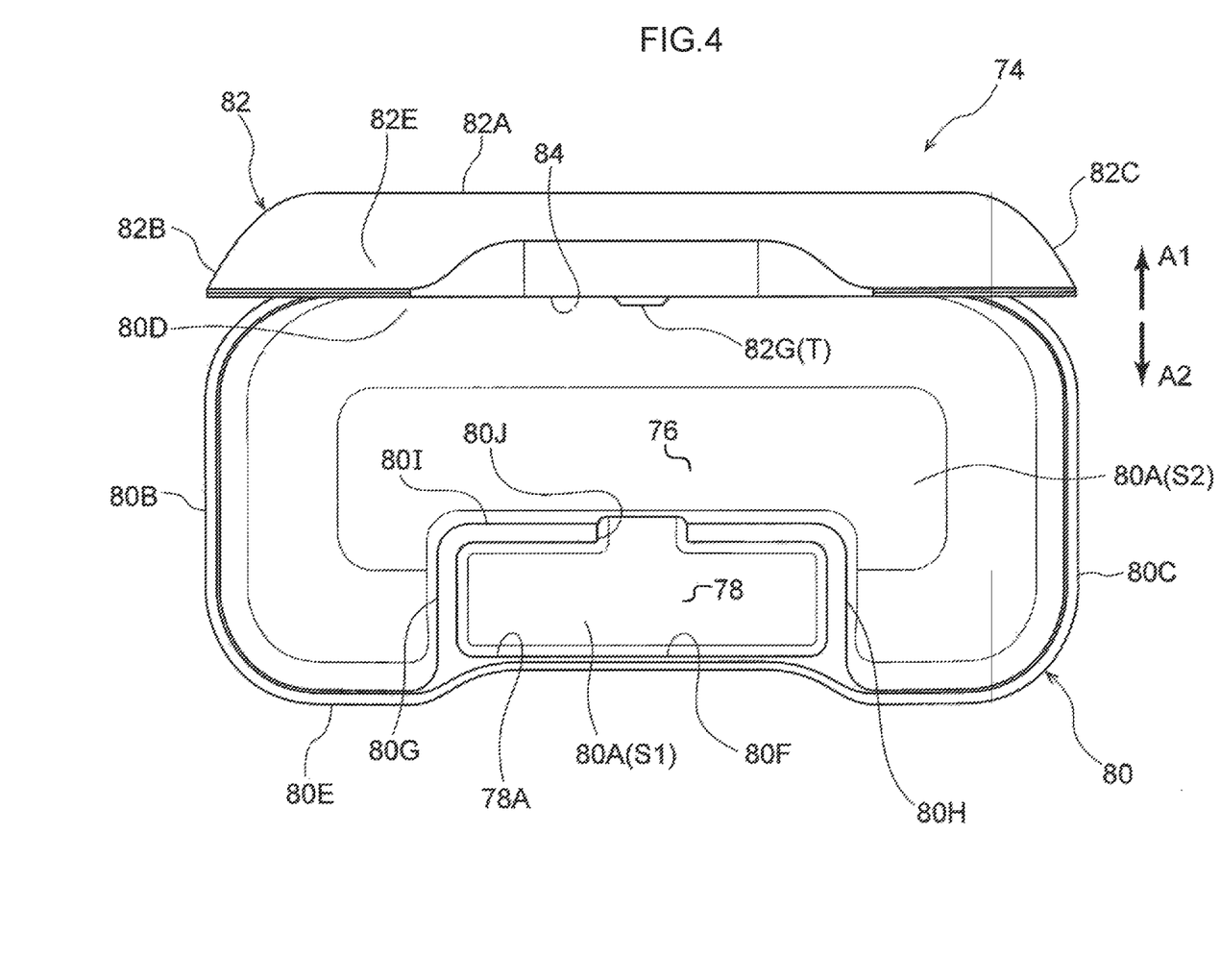
FIG. 4 is a plan view showing the eyeglasses case in a state in which a cover portion has been opened.
Figure 5:
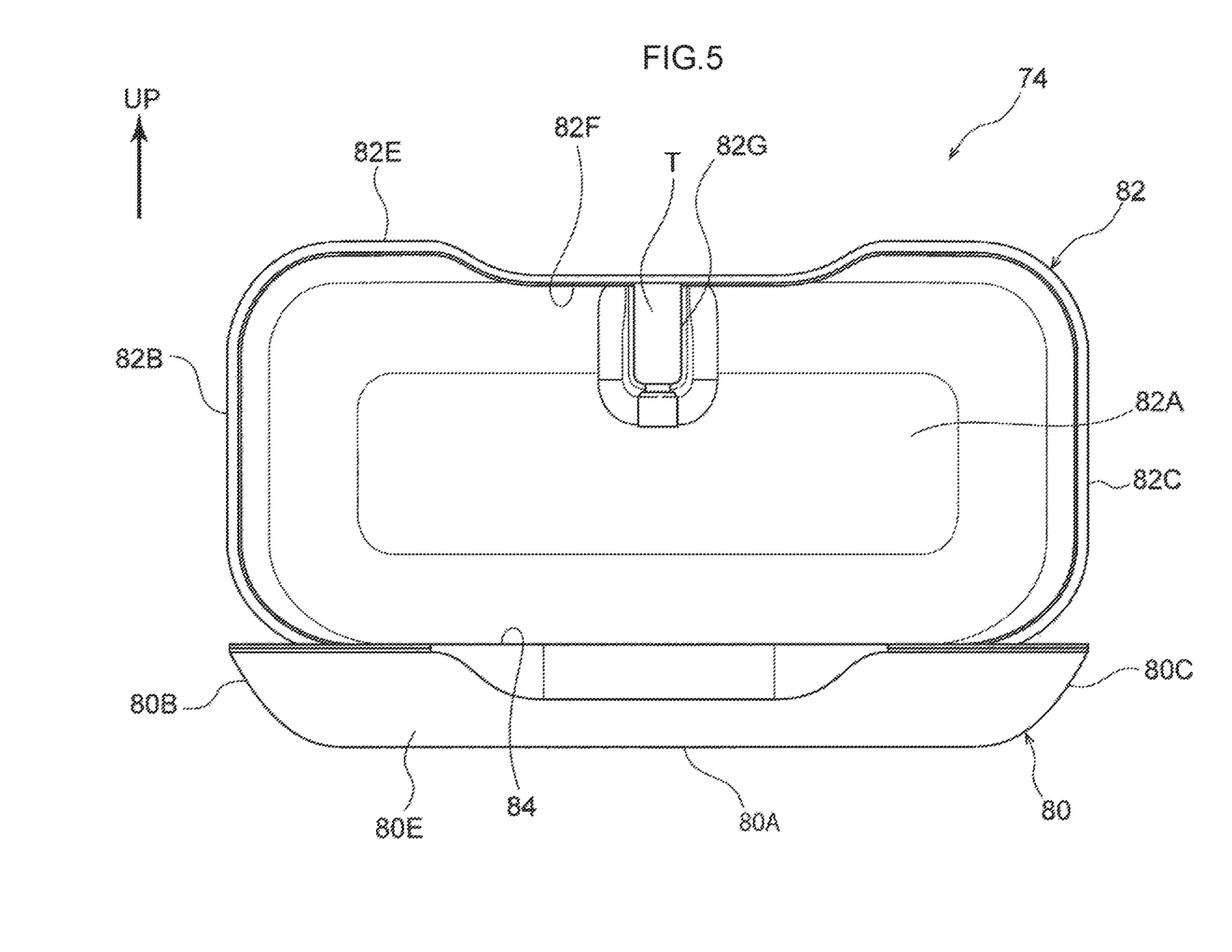
FIG. 5 is a front view showing the eyeglasses case in the state in which the cover portion has been opened.

An eyeglasses case, which serves as an eyewear case relating to an embodiment of the present invention, is described by using FIG. 1 through FIG. 5. Note that arrow UP that is shown in FIG. 1, FIG. 4 and FIG. 5 indicates the upper side in a state in which the eyeglasses case is placed on a desk or the like. Further, arrow FR shown in FIG. 2 indicates the front side seen from a user who is wearing electronic eyeglasses that serve as eyewear to be accommodated in the eyeglasses case, and arrow UP indicates the upper side, and arrows RH and LH indicate the right side and the left side.

Note that, in the following embodiment, eyeglasses are given as an example of the eyewear, but the present invention is not limited to this. It suffices for the present invention to be a case that accommodates eyewear that is worn on the head, ears, or a vicinity of the eyes of a user. So-called eyeglasses (including electronic eyeglasses) that have an auxiliary mechanism for improving the visual acuity of a user such as lenses, and various types of devices (e.g., a eyeglasses-type wearable terminal, a head mounted display, and the like) having mechanisms that carry out the providing of information to the visual field or the eyes of a user, are included as eyewear.

As shown in FIG. 1, an eyeglasses case 74 of the present embodiment is used for accommodating electronic eyeglasses 10 and a charger 72 that are shown in FIG. 2 and FIG. 3. Hereinafter, first, the electronic eyeglasses 10 and the charger 72 will be described, and then the eyeglasses case 74 will be described.

(Description of Electronic Eyeglasses 10 and Charger 72)
As shown in FIG. 2 and FIG. 3, the electronic eyeglasses 10 of the present embodiment can change the focal length (strength) of portions of left and right lenses 12, 14 by switch operation of the user. Concretely, the electronic eyeglasses 10 has a frame 16 that is worn by the user, the pair of left and right lenses 12, 14 that are held by the frame 16, and a liquid crystal driving portion 20 that drives liquid crystals 18 that are provided at the lenses 12, 14.

As shown in FIG. 2, the frame 16 has a right side rim 22 and a left side rim 24, in which the lens 14 at the right side and the lens 12 at the left side are held respectively and which are formed in annular shapes as seen in a front view (as seen from the front side of the user of the electronic eyeglasses 10), and a bridge 26 that connects the right side rim 22 and the left side rim 24 in the left-right direction. Further, pad portions 28 that anchor on the nose of the user are formed at the portions, which are adjacent to the bridge 26, of the right side rim 22 and the left side rim 24. Further, the frame 16 has a right side temple 30 that serves as a temple that is tiltably mounted to the right side end portion of the right side rim 22, and a left side temple 32 that serves as a temple that is tiltably mounted to the left side end portion of the left side rim 24. As shown in FIG. 2, the right side temple 30 is structured to include a right side temple main body 34 having a groove portion 36 whose user side is open, and a temple cover portion 38 that, by being mounted to the right side temple main body 34, closes the groove portion 36 that is formed in the right side temple main body 34.

The liquid crystal driving portion 20 is for changing the array of the liquid crystal 18 (see FIG. 3) that is provided at the lens 12. This liquid crystal driving portion 20 has a control module 40, a flexible cable 42 that is connected to the control module 40, a battery 44 that serves as an accessory, and a switch 46. The control module 40 is disposed within the groove portion 36 of the right side temple main body 34. Further, due to the temple cover portion 38 being mounted to the right side temple main body 34, it is made such that the control module 40 is not exposed toward the user side. Further, the switch 46 is fixed to the side that is opposite from the user (the side opposite from the side in which the groove portion 36 is formed) at the right side temple main body 34. Note that the switch 46 of the present embodiment is an electrostatic capacitance touch switch that can carry out switch operations by being touched by the user. Further, the battery 44 is removably mounted to the rear end portion of the right side temple 30. The flexible cable 42 is laid from the control module 40, which is disposed within the right side temple 30, to the region at the upper side of the right side rim 22 and the regions at the upper sides of the bridge 26 and the left side rim 24. Further, due to the left and right lenses 12, 14 being fixed to (fit-into) the right side rim 22 and the left side rim 24 respectively, the liquid crystal 18 provided at the lens 12 and the flexible cable 42 are connected through an unillustrated connecting line.

The lenses 12, 14 are described next. Note that, because the lens 14 at the right side and the lens 12 at the left side are formed so as to be symmetrical at the left and the right, in the following explanation, the lens 12 at the left side is described, and the respective portions of the lens 14 at the right side which are the same as those of the lens 12 at the left side are denoted by the same reference numerals, and description thereof is omitted.

As shown in FIG. 3, the lens 12 has a lens main body 68 having a front surface lens 54 and a lens 56 with a diffraction portion, which are superposed and joined together in the thickness direction of the lens 12. The front surface lens 54 and the lens 56 with a diffraction portion that structure portions of the lens main body 68 are gently curved so as to be convex toward the front side. Further, at the front surface lens 54 and the lens 56 with a diffraction portion, portions, which are other than the portion at which a diffraction portion 60 that is described later is provided, are joined via an unillustrated adhesive layer. Note that the previously-mentioned electrodes are disposed within this adhesive layer.

The diffraction portion 60 which serves as a Fresnel lens portion is provided at a portion of the lens 56 with a diffraction portion. This diffraction portion 60 has the structure of a so-called Fresnel lens in which the front surface lens 54 side (the front surface side) has a sawtooth shaped cross-section. Further, the liquid crystal 18, which serves as a refractive index changing layer whose refractive index changes due to the liquid crystal 18 being energized, is interposed between the diffraction portion 60 of the lens 56 with a diffraction portion and the front surface lens 54. Further, when voltage is applied to the liquid crystal 18 due to the operation of the switch 46 being carried out by the user of the electronic eyeglasses 10, the array of the liquid crystal 18 is changed, and the refractive index of the liquid crystal 18 changes. Due thereto, at the left and right lenses 12, 14, the strengths of the portions at which the diffraction portions 60 are provided can be made to be high as compared with the strengths of the portions around the diffraction portions 60 (the focal length of the portions where the diffraction portions 60 are provided can be made to be short as compared with the focal length of the portions around the diffraction portions 60).

As shown in FIG. 2, the charger 72 that serves as an accessory for charging is for charging the battery 44, and this charger 72 is formed in a substantially parallelepiped shape. A length direction one side end portion of the charger 72 is a battery connection portion 72A to which the battery 44 is connected. The length direction other side end portion of the charger 72 is a connector portion 72B that is connected to a USB connector provided at a personal computer or the like. Note that USB is the abbreviation for Universal Serial Bus, and is one serial bus standard for connecting a peripheral device to a computer. Further, the battery 44 can be charged due to the connector portion 72B of the charger 72 being connected to a USB connector in a state in which the battery is connected to the battery connecting portion 72A.

(Description of Eyeglasses Case 74)
As shown in FIG. 1, the eyeglasses case 74 has a case main body 80 having an eyeglasses accommodating portion 76 that serves as an eyewear accommodating portion in which the electronic eyeglasses 10 (see FIG. 3 and the like) are accommodated, and a charger accommodating portion 78 that serves as an accessory accommodating portion in which the charger 72 (see FIG. 2) is accommodated. Further, the eyeglasses case 74 has a cover portion 82 that is tiltably (rotatably) connected to the case main body 80 via a hinge portion 84, and that, together with the case main body 80, forms a space in which the electronic eyeglasses 10 and the charger 72 are accommodated. Note that the structure of the hinge portion 84 of the present embodiment is a so-called integral hinge structure, but a hinge portion of another structure may be used.

The case main body 80 is formed in the shape of a box having a bottom at which the upper side is open and the lower side is closed. Concretely, as shown in FIG. 1 and FIG. 4, the case main body 80 has a bottom wall portion 80A that is formed in a substantially rectangular shape as seen from the upper side, a first side wall portion 80B that extends toward the upper side from a length direction one side end portion of the bottom wall portion 80A, and a second side wall portion 80C that extends toward the upper side from the length direction other side end portion of the bottom wall portion 80A and is disposed so as to face the first side wall portion 80B. Further, the case main body 80 has a third side wall portion 80D that extends toward the upper side from a short-side direction one side end portion of the bottom wall portion 80A, and a fourth side wall portion 80E that extends toward the upper side from a short-side direction other side end portion of the bottom wall portion 80A and is disposed so as to face the third side wall portion 80D. Further, the border portions of the bottom wall portion 80A and the first side wall portion 80B, the second side wall portion 80C, the third side wall portion 80D and the fourth side wall portion 80E are curved gently. The border portions of the first side wall portion 80B with the third side wall portion 80D and the fourth side wall portion 80E, and the border portions of the second side wall portion 80C with the third side wall portion 80D and the fourth side wall portion 80E, also are curved gently. The bottom surface and the side surfaces of the case main body 80 are formed by the above-described bottom wall portion 80A, first side wall portion 80B, second side wall portion 80C, third side wall portion 80D and fourth side wall portion 80E.

The central portion of the fourth side wall portion 80E is made to be a convex portion 80F that is formed in a shape that is convex toward the third side wall portion 80D side. Further, a first center wall portion 80G and a second center wall portion 80H, whose lower end portions are connected to the bottom wall portion 80A, respectively extend from the one side end and the other side end of the convex portion 80F. Moreover, the end portion, which is at the side opposite from the fourth side wall portion 80E, of the first center wall portion 80G and the end portion, which is at the side opposite from the fourth side wall portion 80E, of the second center wall portion 80H are connected via a third center wall portion 80I whose lower end portion is connected to the bottom wall portion 80A. Further, a cut-out portion 80J is formed in the upper end portion of the length direction center of the third center wall portion 80I.

At the above-described case main body 80, the region, which is surrounded by the bottom wall portion 80A, the first side wall portion 80B, the second side wall portion 80C, the third side wall portion 80D, the fourth side wall portion 80E, the first center wall portion 80G the second center wall portion 80H and the third center wall portion 80I, is the eyeglasses accommodating portion 76 in which the electronic eyeglasses 10 (see FIG. 3) are accommodated. This eyeglasses accommodating portion 76 is formed in a substantial U-shape of a shallow bottom (an angular U-shape of a shallow bottom) as seen from the upper side (as seen from the opening direction of the case main body 80).

Further, at the case main body 80, the region, which is surrounded by the bottom wall portion 80A, the area where the convex portion 80F of the fourth side wall portion 80E is formed, the first center wall portion 80G the second center wall portion 80H and the third center wall portion 80I, is the charger accommodating portion 78 in which the charger 72 (see FIG. 2) is accommodated from an opening portion 78A that is formed at the upper end portion of the region. In other words, the charger accommodating portion 78 is connected to the bottom surface and a side surface of the case main body 80 at the side opposite from the side at which the hinge portion 84 is provided. Note that, at the bottom wall portion 80A, portion S1 that forms the charger accommodating portion 78 has a bottom that is elevated with respect to that of portion S2 that forms the eyeglasses accommodating portion 76 (is apart from the surface on which the eyeglasses case 74 is placed).

As shown in FIG. 5, the cover portion 82 is formed in the shape of a box having a ceiling whose one side is open and whose other side is closed. Concretely, the cover portion 82 has a top wall portion 82A that is formed in a substantially rectangular shape, a first side wall portion 82B that extends out toward a thickness direction one side of the top wall portion 82A from a length direction one side end portion of the top wall portion 82A, and a second side wall portion 82C that extends out toward the thickness direction one side of the top wall portion 82A from the length direction other side end portion of the top wall portion 82A and that is disposed so as to face the first side wall portion 82B. Further, the cover portion 82 has a third side wall portion 82D that extends out toward the thickness direction one side of the top wall portion 82A from a short-side direction one side end portion of the top wall portion 82A, and a fourth side wall portion 82E that extends out toward the thickness direction one side of the top wall portion 82A from the short-side direction other side end portion of the top wall portion 82A and is disposed so as to face the third side wall portion 82D. Further, in the same way as at the case main body 80, the border portions of the top wall portion 82A and the first side wall portion 82B, the second side wall portion 82C, the third side wall portion 82D and the fourth side wall portion 82E are curved gently. The border portions of the first side wall portion 82B with the third side wall portion 82D and the fourth side wall portion 82E, and the border portions of the second side wall portion 82C with the third side wall portion 82D and the fourth side wall portion 82E, also are curved gently. The upper surface and the side surfaces of the cover portion 82 are formed by the above-described top wall portion 82A, first side wall portion 82B, second side wall portion 82C, third side wall portion 82D and fourth side wall portion 82E.

Further, a convex portion 82F, which corresponds to the convex portion 80F (see FIG. 4) that is formed in the fourth side wall portion 80E of the case main body 80, is formed in the central portion of the fourth side wall portion 82E. A displacement restricting portion 82Q which is shaped as a rectangular block and serves as a restricting portion and a portion of which is connected to the top wall portion 82A, stands erect from the length direction central portion of the top wall portion 82A at the convex portion 82F. In other words, this displacement restricting portion 82G is connected to the upper surface and a side surface of the cover portion 82, at the side opposite from the side at which the hinge portion 84 is provided. As shown in FIG. 4 and FIG. 5, end portion T, which is at the side opposite from the top wall portion 82A, of this displacement restricting portion 82G projects-out further toward the side opposite from the top wall portion 82A than the end, which is at the side opposite from the top wall portion 82A, of the fourth side wall portion 82E. Due thereto, the end portion T, which is at the side opposite from the top wall portion 82A, at the displacement restricting portion 82G abuts the edge portion of the opening portion 78A of the charger accommodating portion 78, and can close (block off) the length direction central portion of the opening portion 78A.

The above-described third side wall portion 82D of the cover portion 82 and third side wall portion 80D of the case main body 80 are connected via an unillustrated hinge. Due thereto, the cover portion 82 can be tilted with respect to the case main body 80.

Operation and Effects of Present Embodiment

Operation and effects of the present embodiment are described next.

Figure 6:
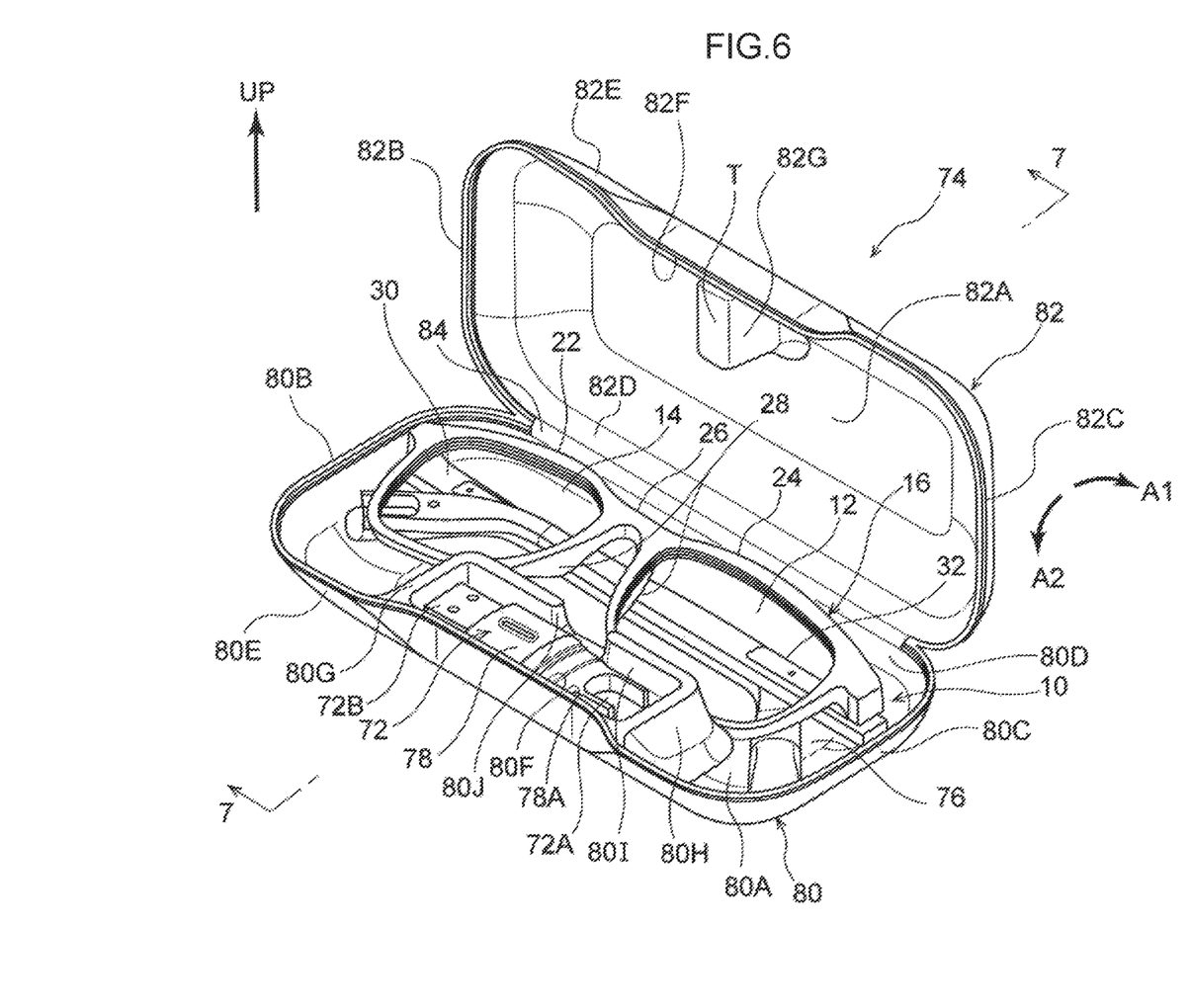
FIG. 6 is a perspective view that corresponds to FIG. 1 and shows the eyeglasses case in a state in which the electronic eyeglasses are accommodated in an eyeglasses accommodating portion and a charger is accommodated in a charger accommodating portion.

As shown in FIG. 1, in accordance with the eyeglasses case 74 of the present embodiment, due to the cover portion 82 being tilted in opening direction A1 (arrow A1 direction) with respect to the case main body 80, as shown in FIG. 6, the electronic eyeglasses 10 and the charger 72 can be accommodated in the eyeglasses accommodating portion 76 and the charger accommodating portion 78 of the case main body 80, respectively. Here, in the present embodiment, the shape of the inner peripheral surface of the eyeglasses accommodating portion 76 interior is set such that, in the state in which the frame 16 of the electronic eyeglasses 10 is folded-up, the electronic eyeglasses 10 are accommodated within the eyeglasses accommodating portion 76 in a state in which the pad portions 28 are placed toward the charger accommodating portion 78 side, and the right side temple 30 and the left side temple 32 are disposed further toward the bottom wall portion 80A side than the right side rim 22 and the left side rim 24. In other words, the inner peripheral surface of the eyeglasses accommodating portion 76 interior functions as a guide surface for accommodating the electronic eyeglasses 10 into the eyeglasses accommodating portion 76 at a predetermined posture. Further, in the present embodiment, the end portions of the right side temple 30 and the left side temple are respectively disposed at the both sides of the charger accommodating portion 78 at the interior of the eyeglasses accommodating portion 76. Due thereto, movement of the electronic eyeglasses 10 within the eyeglasses accommodating portion 76 can be restricted.

Figure 7:
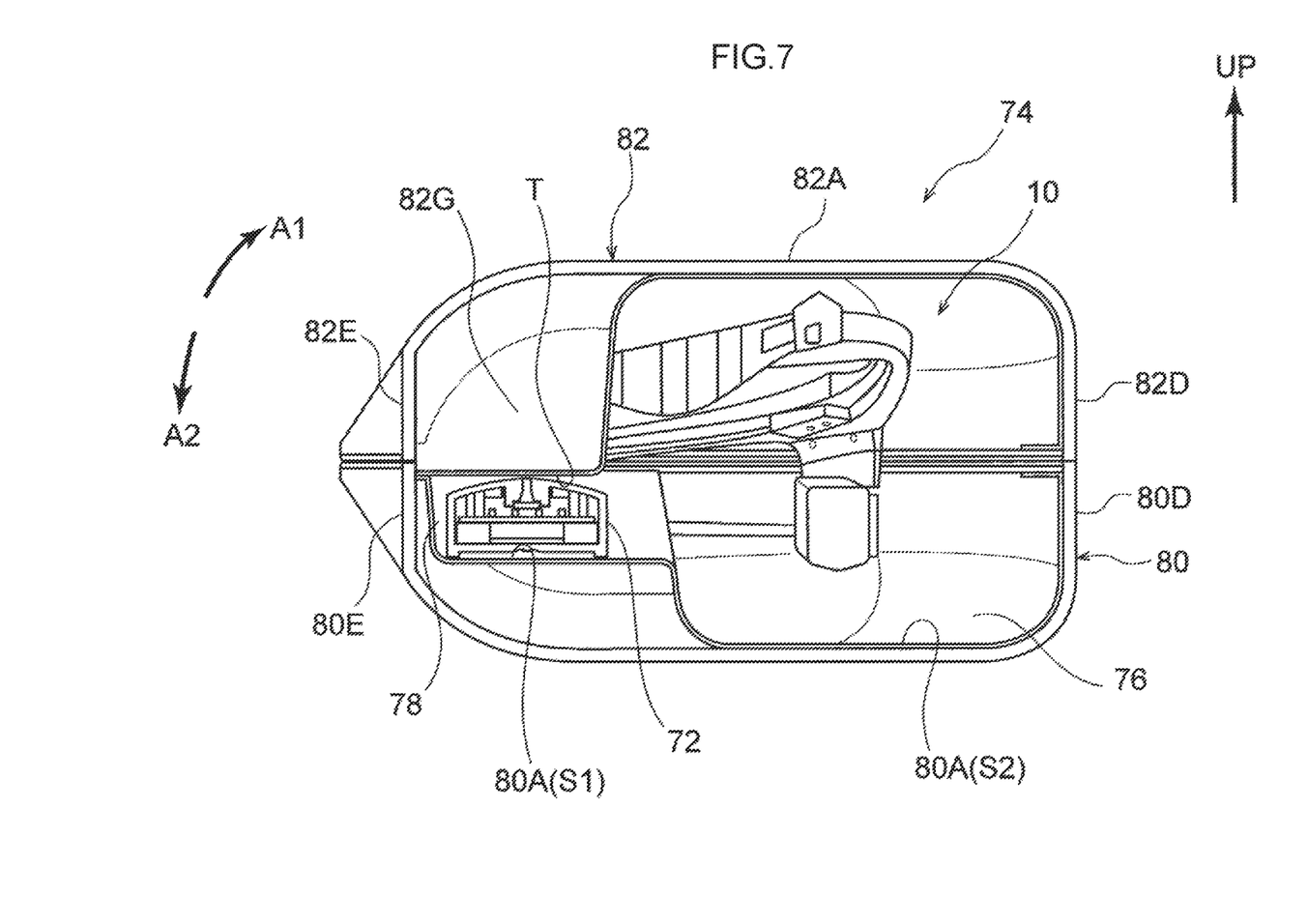
FIG. 7 is a cross-sectional view that is cut along a line corresponding to line 7-7 shown in FIG. 6, and that shows the cross-section of the eyeglasses case and the like in a state in which the cover portion has been closed.

Further, due to the cover portion 82 being tilted in closing direction A2 (arrow A2 direction) with respect to the case main body 80, as shown in FIG. 7, the electronic eyeglasses 10 and the charger 72 that are accommodated in the eyeglasses accommodating portion 76 and the charger accommodating portion 78 of the case main body 80 can be accommodated within the closed space that is formed between the case main body 80 and the cover portion 82. Further, as shown in FIG. 7, a portion of the frame 16 and portions of the left and right lenses 12, 14 of the electronic eyeglasses 10 can be positioned at the upper portion of the charger accommodating portion 78. Namely, in the state in which the cover portion 82 closes the case main body 80, a portion of the frame 16 and portions of the left and right lenses 12, 14 of the electronic eyeglasses 10 are positioned between the charger accommodating portion 78 and the cover portion 82. Therefore, in the state in which the cover portion 82 closes the case main body 80, rattling, in the height direction within the charger accommodating portion 78, of the electronic eyeglasses 10 that are accommodated in the case main body 80 is suppressed. Further, due to the charger accommodating portion 78 being disposed in the space that is formed between the bottom surface of the case main body 80 and portions of the frame 16 and the left and right lenses 12, 14 of the electronic eyeglasses 10, the interior of that space is utilized effectively.

Here, in the present embodiment, the end portion T, which is at the side opposite from the top wall portion 82A, at the displacement restricting portion 82G closes the length direction central portion of the opening portion 78A of the charger accommodating portion 78. Due thereto, movement, toward the top wall portion 82A side of the cover portion 82, of the charger 72 that is accommodated in the charger accommodating portion 78 of the case main body 80 is restricted. Due thereto, removal of the charger 72 from the charger accommodating portion 78 interior is suppressed. As a result, at the time when the electronic eyeglasses 10 and the charger 72 are carried-around in a state in which the electronic eyeglasses 10 and the charger 72 are accommodated within the eyeglasses case 74, the electronic eyeglasses 10 and the charger 72 interfering with one another can be prevented or suppressed.

Further, in the present embodiment, the dimensions with respect to the top wall portion 82A of the displacement restricting portion 82G are set such that, in the state in which the cover portion 82 closes the case main body 80, the displacement restricting portion 82G that is provided at the cover portion 82 abuts or is disposed adjacent to the charger 72. Due thereto, rattling of the charger 72 within the charger accommodating portion 78 can be suppressed. Note that, due to the end portion T, which is at the side opposite from the top wall portion 82A, of the displacement restricting portion 82G abutting the charger 72, the charger 72 rattling within the charger accommodating portion 78 is suppressed even more. Further, other accessories such as the spare battery 44 (see FIG. 2) for the electronic eyeglasses 10, a charging cable that serves as an accessory for charging, a camera, a projector, a memory, or the like may be accommodated in the charger accommodating portion 78.

Moreover, in the present embodiment, in the state in which the cover portion 82 closes the case main body 80, the displacement restricting portion 82G that is provided at the cover portion 82 is disposed between the left and right lenses 12, 14 of the electronic eyeglasses 10 and is disposed between the pair of pad portions 28. Due thereto, rattling of the electronic eyeglasses 10 within the eyeglasses accommodating portion 76 can be suppressed.

Further, in the present embodiment, the charger accommodating portion 78 is connected to the bottom surface and a side surface of the case main body 80, and the displacement restricting portion 82G is connected to the upper surface and a side surface of the cover portion 82. Due thereto, the rigidity of the portions, at which the charger accommodating portion 78 and the displacement restricting portion 82G are provided, at the case main body 80 and the cover portion 82 can be improved.

Moreover, in the present embodiment, the charger accommodating portion 78 and the displacement restricting portion 82G are provided at the side opposite from the side at which the hinge portion 84 is provided. Due thereto, at the time when the cover portion 82 is tilted with respect to the case main body 80, the charger accommodating portion 78 and the displacement restricting portion 82G can be moved apart. Namely, the clearance between the charger accommodating portion 78 and the displacement restricting portion 82G can be ensured. Due thereto, the charger 72 can easily be accommodated in the charger accommodating portion 78.

Note that the present embodiment describes an example in which the present invention is applied to the eyeglasses case 74 that is for accommodating the electronic eyeglasses 10 and the charger 72. However, the present invention can also be applied to eyewear cases that accommodate other eyewear and accessories. Namely, the eyeglasses accommodating portion 76 is an eyewear accommodating portion, and the above-described various eyewear can be accommodated therein. Further, the charger accommodating portion 78 is a eyewear accessory accommodating portion, and compact devices that are connected by a wire or wirelessly to the eyewear are examples of eyewear accessories other than a charger. For example, a charging cable that is connected to the eyewear and used in charging, a projector or display for carrying out information display with respect to the eyewear, a communication device for carrying out wireless communication with the eyewear, a microphone and a speaker that carry out transmission and reception of voice signals and image signals with the eyewear, a camera, and the like are examples.

Although an embodiment of the present invention has been described above, the present invention is not limited to the above, and, of course, can be embodied by being modified in various ways other than the above within a scope that does not depart from the gist thereof.

The invention claimed is:

1. An eyewear case comprising:
a case main body, comprising:
an eyewear accommodating portion configured to accommodate eyewear; and
an accessory accommodating portion configured to accommodate an accessory of an eyewear, the accessory accommodating portion sectioned off from the eyewear accommodating portion by a plurality of walls extending from the case main body, wherein the plurality of walls include a first center wall and a second center wall that intersect with a third center wall, the third center wall extending in a longitudinal direction of the case main body, wherein an opening is formed in the third center wall; and
a cover portion that, by closing the case main body, forms a space in which the eyewear and the accessory are accommodated between the cover portion and the case main body, the cover portion having a restricting portion that restricts movement of the accessory within the accessory accommodating portion,
wherein the eyewear has temples that are worn at a head portion of a user,
wherein the case main body is substantially rectangular, and the accessory accommodating portion is provided at a central portion in the longitudinal direction of the case main body, and
when the eyewear is accommodated in the eyewear accommodating portion, the temples are disposed at both sides of the accessory accommodating portion in the length direction of the case main body.

2. The eyewear case of claim 1, wherein, when the cover portion closes the case main body, the restricting portion abuts the accessory accommodating portion or the accessory that is accommodated in the accessory accommodating portion.

3. The eyewear case of claim 1, wherein when the cover portion closes the case main body, the restricting portion is positioned so as to block off at least a portion of the opening of the accessory accommodating portion.

4. The eyewear case of claim 1,
wherein the plurality of walls that section off the eyewear accommodating portion form a U-shape as seen from a direction of opening the eyewear accommodating portion.

5. The eyewear case of claim 1, wherein the accessory accommodating portion is provided so as to be connected to both a bottom surface and a side surface of the case main body.

6. The eyewear case of claim 1, wherein the restricting portion is connected to both an upper surface and a side surface of the cover portion.

7. The eyewear case of claim 1, wherein the cover portion is rotatably mounted to the case main body via a hinge portion,
wherein the accessory accommodating portion is provided at a side of the case main body that is opposite from the hinge portion, and
wherein the restricting portion is provided at a side of the cover portion that is opposite from the hinge portion.

8. The eyewear case of claim 1, wherein the eyewear accommodating portion is an eyeglasses accommodating portion configured to accommodate eyeglasses that have a frame and a pair of lenses that are held at the frame, and
wherein when the cover portion is closed, the restricting portion is positioned between the pair of lenses.

9. An eyewear case, comprising:
a case main body having a plurality of walls extending from the case main body, wherein the plurality of walls define an accessory storage portion; and
a cover that is connected to the case main body and is configured to form an enclosed space with the case main body when the cover is in a closed position,
wherein an eyewear storage portion configured to accommodate eyewear is disposed in the case main body and is separated from the accessory storage portion by the plurality of walls,
wherein the plurality of walls include a first center wall and a second center wall that intersect with a third center wall,
wherein an opening is formed in the third center wall,
wherein a restricting protrusion extends from the cover and is positioned to align with the opening when the cover is closed on the case main body,
wherein a length of an end of the restricting protrusion is smaller than a length of the opening in the longitudinal direction of the accessory storage portion,
wherein the eyewear has temples that are worn at a head portion of a user,
wherein the case main body is substantially rectangular, and the accessory storage portion is provided at a central portion in the longitudinal direction of the case main body, and
when the eyewear is accommodated in the eyewear storage portion, the temples are disposed at both sides of the accessory storage portion in the length direction of the case main body.

10. An eyewear case, comprising:
a case main body having a plurality of walls extending from the case main body, wherein the plurality of walls defines an accessory storage portion; and
a cover that is connected to the case main body and is configured to form an enclosed space with the case main body when the cover is in a closed position,
wherein an eyewear storage portion configured to accommodate eyewear is disposed in the case main body and is separated from the accessory storage portion by the plurality of walls,
wherein the plurality of walls include a first center wall and a second center wall that intersect with a third center wall,
wherein an opening is formed in the third center wall,
wherein a bottom surface of the accessory storage portion is elevated with respect to a bottom surface of the eyewear storage portion, wherein the eyewear has temples that are worn at a head portion of a user, wherein the case main body is substantially rectangular, and the accessory storage portion is provided at a central portion in the longitudinal direction of the case main body, and when the eyewear is accommodated in the eyewear storage portion, the temples are disposed at both sides of the accessory storage portion in the length direction of the case main body.

* * * * *